(12) United States Patent
Matson et al.

(10) Patent No.: US 12,093,859 B1
(45) Date of Patent: Sep. 17, 2024

(54) SYSTEMS AND METHODS TO MEASURE AND VISUALIZE WORKLOAD FOR INDIVIDUAL USERS

(71) Applicant: ASANA, INC., San Francisco, CA (US)

(72) Inventors: Nicolle Alexandra Matson, Brooklyn, NY (US); Paige Elizabeth Costello, San Anselmo, CA (US); Yasmin Mandvi Kothari, Jersey City, NJ (US); Savannah Joy Whitney, San Francisco, CA (US)

(73) Assignee: Asana, Inc., San Francisco, CA (US)

(*) Notice: Subject to any disclaimer, the term of this patent is extended or adjusted under 35 U.S.C. 154(b) by 426 days.

(21) Appl. No.: 17/337,408

(22) Filed: Jun. 2, 2021

(51) Int. Cl.
G06Q 10/0631 (2023.01)
G06F 3/04817 (2022.01)
G06Q 10/0633 (2023.01)

(52) U.S. Cl.
CPC . *G06Q 10/063114* (2013.01); *G06F 3/04817* (2013.01); *G06Q 10/06314* (2013.01); *G06Q 10/06316* (2013.01); *G06Q 10/0633* (2013.01)

(58) Field of Classification Search
None
See application file for complete search history.

(56) References Cited

U.S. PATENT DOCUMENTS

| | | | |
|---|---|---|---|
| 5,233,687 A | 8/1993 | Henderson, Jr. | |
| 5,524,077 A | 6/1996 | Faaland | |
| 5,530,861 A | 6/1996 | Diamant | |
| 5,608,898 A | 3/1997 | Turpin | |
| 5,611,076 A | 3/1997 | Durflinger | |
| 5,623,404 A | 4/1997 | Collins | |
| 5,721,770 A | 2/1998 | Kohler | |
| 5,983,277 A | 11/1999 | Heile | |
| 6,024,093 A | 2/2000 | Cron | |
| 6,256,651 B1 | 7/2001 | Tuli | |
| 6,292,830 B1 | 9/2001 | Taylor | |
| 6,332,147 B1 | 12/2001 | Moran | |
| 6,385,639 B1 | 5/2002 | Togawa | |
| 6,621,505 B1 | 9/2003 | Beauchamp | |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

Macro, computer science, wikipedia, archives org Feb. 11, 2020 http://web.archive.org/web/20200211082902/https://en.wikipedia.org/wiki/Macro_(computer_science) (Year: 2020).

(Continued)

*Primary Examiner* — Eric W Stamber
*Assistant Examiner* — Ashley Y Young
(74) *Attorney, Agent, or Firm* — Esplin & Associates, PC

(57) ABSTRACT

Systems and methods for measuring and visualizing workload for individual users are disclosed. Exemplary implementations may: manage environment state information describing units of work assigned to individual users within the collaboration environment; determine values of a workload parameter for the individual users; effectuate presentation of user interface including individual date panes configured to reflect the values of the workload parameter; and/or perform other operations.

16 Claims, 4 Drawing Sheets

(56) References Cited

U.S. PATENT DOCUMENTS

| | | |
|---|---|---|
| 6,629,081 B1 | 9/2003 | Cornelius |
| 6,769,013 B2 | 7/2004 | Frees |
| 6,859,523 B1 | 2/2005 | Jilk |
| 6,938,048 B1 | 8/2005 | Jilk |
| 7,003,668 B2 | 2/2006 | Berson |
| 7,020,697 B1 | 3/2006 | Goodman |
| 7,039,596 B1 | 5/2006 | Lu |
| 7,039,654 B1 | 5/2006 | Eder |
| 7,086,062 B1 | 8/2006 | Faour |
| 7,146,326 B1 | 12/2006 | White |
| 7,155,400 B1 | 12/2006 | Jilk |
| 7,349,920 B1 | 3/2008 | Feinberg |
| 7,401,131 B2 | 7/2008 | Robertson |
| 7,418,482 B1 | 8/2008 | Lusher |
| 7,428,723 B2 | 9/2008 | Greene |
| 7,640,511 B1 | 12/2009 | Keel |
| 7,644,145 B2 | 1/2010 | Rockwell |
| 7,676,542 B2 | 3/2010 | Moser |
| 7,702,532 B2 | 4/2010 | Shirley |
| 7,778,866 B2 | 8/2010 | Hughes |
| 7,779,039 B2 | 8/2010 | Weissman |
| RE41,737 E | 9/2010 | Leem |
| 7,792,795 B1 | 9/2010 | Swartz |
| 7,805,327 B1 | 9/2010 | Schulz |
| RE41,848 E | 10/2010 | Daniell |
| 7,831,978 B2 | 11/2010 | Schaad |
| 7,840,943 B2 | 11/2010 | Volkov |
| 7,917,855 B1 | 3/2011 | Satish |
| 7,941,453 B1 | 5/2011 | Scheevel |
| 7,945,469 B2 | 5/2011 | Cohen |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,626,547 B2 | 1/2014 | Hirano |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0120480 A1* | 8/2002 | Kroeger ............... G06Q 10/063 |
| | | 705/7.37 |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0216324 A1* | 9/2005 | Maithell ............... G06Q 10/06 |
| | | 705/7.22 |
| 2005/0222971 A1 | 10/2005 | Cary |
| 2006/0028917 A1 | 2/2006 | Wigginton |
| 2006/0041447 A1* | 2/2006 | Vucina ............... G06Q 10/1097 |
| | | 705/7.21 |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |

(56) References Cited

U.S. PATENT DOCUMENTS

| | | |
|---|---|---|
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0114809 A1* | 5/2008 | MacBeth ............ G06Q 10/109 |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2009/0307349 A1 | 12/2009 | Harris |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0254299 A1 | 9/2013 | Burshtein |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |

(56) References Cited

U.S. PATENT DOCUMENTS

| | | |
|---|---|---|
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0294245 A1 | 10/2015 | Nagar |
| 2015/0312375 A1 | 10/2015 | Valey |
| 2015/0317595 A1 | 11/2015 | De |
| 2015/0339006 A1 | 11/2015 | Chaland |
| 2015/0358468 A1 | 12/2015 | Erhart |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0292620 A1 | 10/2016 | De |
| 2016/0300024 A1 | 10/2016 | Janssen |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0052656 A1 | 2/2017 | Ohsumi |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285149 A1 | 10/2018 | Bhandari |
| 2018/0285471 A1 | 10/2018 | Hao |
| 2018/0315491 A1 | 11/2018 | Filipovich |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0197487 A1 | 6/2019 | Jersin |
| 2019/0213509 A1 | 7/2019 | Burleson |
| 2019/0265821 A1 | 8/2019 | Pearl |
| 2019/0286462 A1* | 9/2019 | Bodnick .................. G06F 9/453 |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |

(56) References Cited

U.S. PATENT DOCUMENTS

| | | | |
|---|---|---|---|
| 2020/0219061 A1 | 7/2020 | Guo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0150135 A1 | 5/2021 | Lereya |
| 2021/0150489 A1 | 5/2021 | Haramati |
| 2021/0157978 A1 | 5/2021 | Haramati |
| 2021/0166339 A1 | 6/2021 | Mann |
| 2021/0182475 A1 | 6/2021 | Pelz |
| 2021/0216562 A1 | 7/2021 | Smith |
| 2021/0232282 A1 | 7/2021 | Karpe |
| 2021/0319389 A1 | 10/2021 | Jafari |
| 2021/0320891 A1 | 10/2021 | Rosenstein |
| 2021/0342785 A1 | 11/2021 | Mann |
| 2021/0342786 A1 | 11/2021 | Jiang |
| 2021/0350303 A1 | 11/2021 | Omar |
| 2021/0357380 A1 | 11/2021 | Morad |
| 2021/0357423 A1 | 11/2021 | Haramati |
| 2021/0357862 A1 | 11/2021 | Lereya |
| 2021/0357863 A1 | 11/2021 | Cohen |
| 2021/0382734 A1 | 12/2021 | Rosenstein |
| 2021/0390486 A1 | 12/2021 | Chu |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0171637 A1 | 6/2022 | Sabo |
| 2022/0188715 A1 | 6/2022 | Cheng |
| 2022/0214787 A1 | 7/2022 | Karpe |
| 2022/0215315 A1 | 7/2022 | Sabo |
| 2022/0343282 A1 | 10/2022 | Hood |
| 2022/0414323 A1 | 12/2022 | Sreenivasan |
| 2023/0118369 A1 | 4/2023 | Louis |
| 2023/0153732 A1 | 5/2023 | Akers |
| 2023/0325747 A1 | 10/2023 | Sabo |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

Dawei Li, "Deepcham: Collaborative Edge-Mediated Adaptive Deep Learning for Mobile Object Recognition", 2016, IEEE/ACM, pp. 64-76. (Year: 2016).
Creating Tables with Fields from 2 Different Tables, published: 2009, publisher: StackOverflow, pp. 1-2. (Year: 2009).
"Rules of Data Conversion from Document to Relational Databases", published: 2014, publisher: Future-processing, pp. 1-8 (Year: 2014).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
Www.asana.com (as retrieved from https://web.archive.Org/web/20160101054536/https://asana.com/press and https://web.archive.org/web/20160101054527/https://asana.com/product) (Year: 2016) 15 pages.
"U.S. Appl. No. 14/584,750, Examiner Interview Summary mailed Feb. 25, 2016", 3 pgs.
"U.S. Appl. No. 14/584,750, Non Final Office Action mailed Aug. 28, 2015", 21 pgs.
"U.S. Appl. No. 14/584,750, Notice of Allowance mailed Mar. 28, 2016", 8 pgs.
"U.S. Appl. No. 14/584,750, Response filed Feb. 29, 2015 to Non Final Office Action mailed Aug. 28, 2015", 16 pgs.
"U.S. Appl. No. 14/584,850, Final Office Action mailed Sep. 1, 2017", 31 pgs.
"U.S. Appl. No. 14/584,850, Non Final Office Action mailed Jan. 10, 2017", 9 pgs.
"U.S. Appl. No. 14/584,850, Response filed Apr. 10, 2017 to Non Final Office Action mailed Jan. 10, 2017", 13 pgs.
"How to Asana: Inviting teammates to Asana." YouTube, Asana, Mar. 21, 2017, https://www.youtube.com/watch?v=TLOruY1KyxU ( Year: 2017), 13 pages.
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios, youtube, excerpt, Aug. 1, 2019 https://www.youtube.com/watch?v=7XkNcfFDG6M (Year: 2019) (20 pages).
Asana YouTube channel, list of all product videos, Nov. 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTVVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).

(56) References Cited

OTHER PUBLICATIONS

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Www.cogmotive.com/blog/author/alan Alan Byrne: "Creating a company Shared Calendar in Office 365"; pp. 1-17; Sep. 10, 2013.

Hartmann, "TimeProjectscheduling with resource capacities and requests varying with time: a case study," 2013, Flexible services and manufacturing journal, vol. 25, No. 1, pp. 74-93 (Year: 2013).

Paul Minors, How to automate your tasks, youtube excerpts, Oct. 18, 2019 https://www.youtube.com/watch?v=lwF9XyUQrzw (Year: 2019).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Tiburca, Andrew) Best Team Calendar Applications for 2018-Toggl https://toggl.com/blog/best-team-calendar-applications-for-2018 (Year: 2017).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Assef, F., Cassius, T. S., & Maria, T. S. (2018). Confrontation between techniques of time measurement. Journal of Manufacturing Technology Management, 29(5), 789-810. (Year: 2018).

\* cited by examiner

SYSTEMS AND METHODS TO MEASURE AND VISUALIZE WORKLOAD FOR INDIVIDUAL USERS

FIELD OF THE DISCLOSURE

The present disclosure relates to systems and methods to measure and visualize workload for individual users.

BACKGROUND

Collaboration environments, sometimes referred to as integrated collaboration environments, may enable users to assign projects, tasks, or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as customized views of calendars to organize projects, tasks or other assignments, assigned to users.

SUMMARY

One aspect of the present disclosure relates to a system configured to measure and visualize user workload for individual users. One or more implementations described herein may determine values of a parameter by which workload may be determined (herein referred to as a "workload parameter"), which may describe units of work based on one or more quantities of individual units of work having due dates that fall on one or more individual dates, and/or other quantities used to measure workload. Measuring workload in this manner may provide users with useful data to determine if the quantity of units of work assigned to users on any given day can be completed, and/or if one or more units of work should be reassigned.

One or more implementations of a system to measure and visualize workload for individual users may include one or more hardware processors configured by machine-readable instructions. The processor(s) may be configured to manage environment state information maintaining a collaboration environment and/or other information. The collaboration environment may be configured to facilitate interaction by users with the collaboration environment. The environment state information may define one or more of work unit records, user records, and/or other records. The user records may include user information for the individual users. The work unit records may include work information comprising values of units of work managed, created, and/or assigned within the collaboration environment. The work unit information for individual units of work may include individual due dates for the expected completion of the individual units of work by the individual users assigned to the individual units of work.

The workload component may be configured to determine values of a workload parameter for the individual users. The values of the workload parameter may specify, for individual dates, individual quantities of units of work having due dates that fall on the individual dates. By way of non-limiting illustration, the values of the workload parameter for a first user may specify that a first quantity of units of work have due dates that fall on a first date. Further, the values of the workload parameter for the first user may specify that a second quantity of units of work may have due dates that fall on a second date.

The user interface component may effectuate presentation of a user interface on computing platforms associated with the users. The user interface may display, for the individual users, individual date panes associated with the individual dates. The individual date panes may be configured to reflect the individual quantities of units of work having due dates that fall on the individual dates. By way of non-limiting illustration, the user interface disposed to the first user may display a first date pane for the first date and a second date pane for the second date. The first date pane may reflect the first quantity of units of work and the second date pane may reflect the second quantity of units of work.

The user input component may be configured to obtain input information conveying user input into the individual date panes displayed in the user interface. In some implementations, the user input component may be configured to effectuate presentation of individual lists of the units of work having the due dates that fall on the individual dates in response to the user input. The individual lists may facilitate access to the individual units of work.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
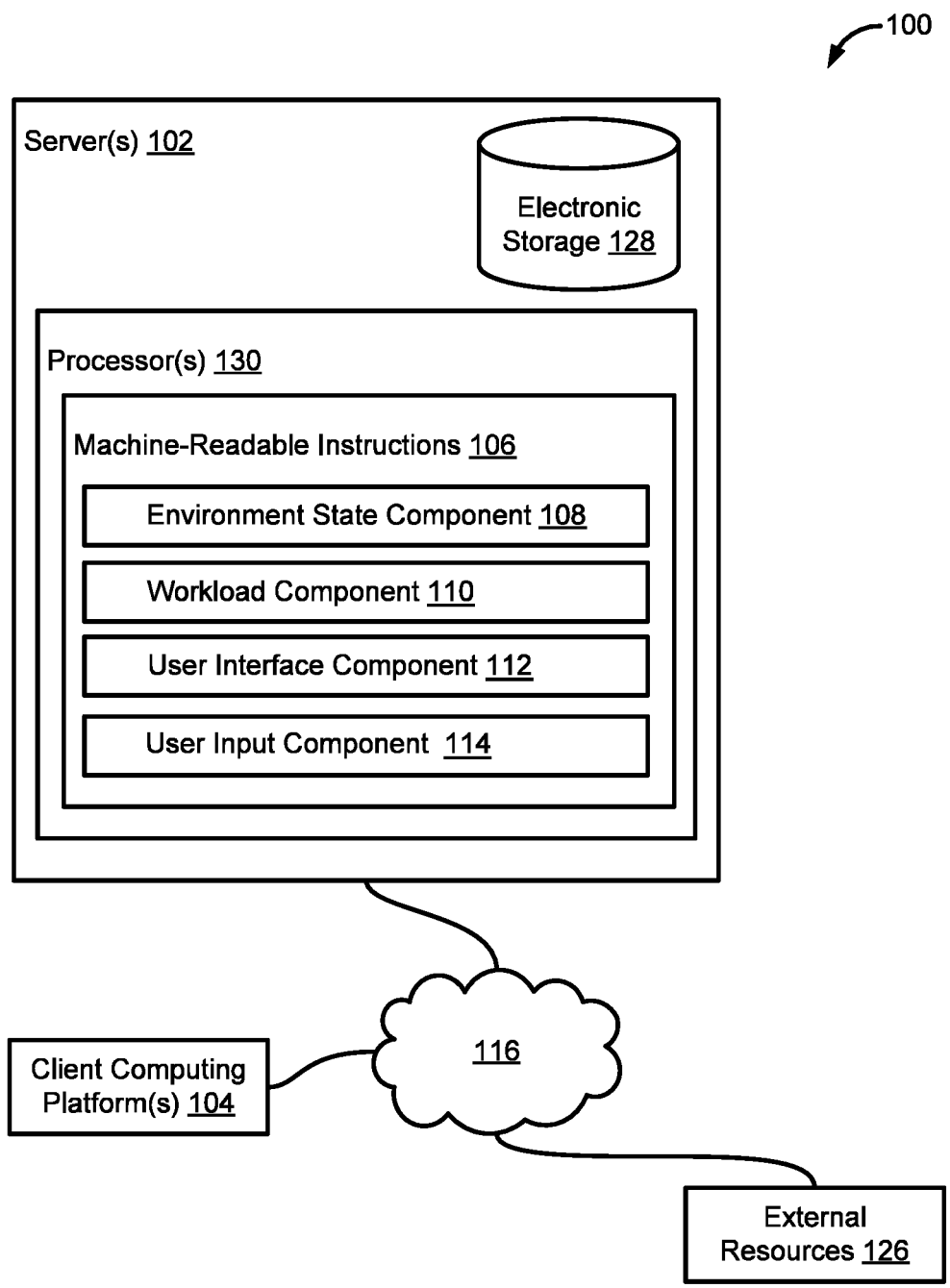
FIG. 1 illustrates a system configured to measure and visualize workload for individual users, in accordance with one or more implementations.

FIG. 1 illustrates a system 100 configured to measure and visualize workload for individual users, in accordance with one or more implementations. An accurate measurement of workload for individual users on individual due dates may prove useful for users or teams of users to have confidence in completing units of work on time. One or more implementation of the system 100 may be configured to present a visual via a user interface on a computing platform associated with the users, representative of individual quantities of units of work having due dates that fall on individual dates. Users may have a general idea of their ability to complete the quantities of units of work. Instead of relying on rough estimates of users abilities, risking that units of work may not be completed by their due dates, a comparison of users abilities and measurements of workloads may provide useful. This comparison may allow users and their teams the chance to redistribute assignment of units of work so that quantities of units of work are completed by their intended due date.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate measuring and visualizing workload for individual users. The instruction components may include one or more of an environment state component 108, a workload component 110, a user interface component 112, a user input component 114, and/or other instruction components.

Environment state component 108 may be configured to manage environment state information and/or other information used in maintaining a collaboration environment. The environment state information may include one or more of work unit records, user records, and/or other records. The user records may include user information for the individual users. The work unit records may include work unit information for units of work managed, created, and/or assigned within the collaboration environment. The work unit information for individual units of work may include individual due dates for expected completion of the individual units of work by individual users assigned to the individual units of work.

The user information in the user records may include values of user parameters. The values of the user parameters may be organized in user records corresponding to user interacting with and/or viewing the collaboration environment. The values of the user parameters may include information describing the users, their actions within the collaboration environment, their settings, their workload capacity for the individual users on individual dates, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, a user role information, a user department, descriptive user content, a to-email, a from-email, a photo, an organization, a workspace, a workload capacity, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more work units the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, schedule information, other user parameters for the given user.

User role information may specify individual roles of the individual users in the individual units of work. A role may represent a position of an individual user. The position may be specified based on a description of one or more of job title, level, stage, and/or other descriptions of position. The role may be specified with respect to a company as a whole, a particular unit of work, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

Schedule information for the individual users may include one or more calendar entries associated with the individual users. The individual calendar entries may be associated with individual start dates and individual end dates.

In some implementations, schedule information may be stored locally within electronic storage 128 by virtue of features and/or functionality provided within a collaboration environment. By way of non-limiting illustration, a collaboration environment may have the features and/or functionality of calendar application configured to facilitate calendaring entries into a schedule. It is noted that schedule information may be determined through features and/or functionality provided by one or more external resources 126. By way of non-limiting illustration, an external resource may include a calendar application which may be external to a collaboration environment. The collaboration environment may have permissions to access the external calendar application to determine and/or obtain schedule information.

The workload capacity may include a threshold quantity of units of work. The threshold quantity may be specified for individual days and/or other periods of time. In some implementations, if the threshold quantity is specified for multiple dates, a daily quantity for individual days may be determined by dividing the threshold quantity for multiple dates by the quantity of days. In some implementations, workload capacity may be specified by one or more users. In some implementations, workload capacity may be determined automatically over time. By way of non-limiting illustration, a first user record for a first user may specify a first threshold quantity of units of work a given day. Accordingly, first threshold quantity may convey that the first user may only be able to complete that quantity of units of work on the first date and/or the second date.

The work information may include values of one or more work unit parameters. The values of the work unit parameters may be organized in work unit records corresponding to units of work managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given unit of work may include one or more projects, tasks, sub-tasks, and/or other units of work possibly assigned to and/or associated with one or more users.

By way of non-limiting illustration, the one or more work unit parameters may include one or more of a workload parameter, a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, the units of work may be described based on one or more of a unit of work name, a unit of work description, one or more unit of work dates (e.g., a start date, a due date, a completion date, and/or dates), one or more members associated with a unit of work (e.g., an owner, one or more other project/task members, member access information, and/or other unit of work members and/or member information), a status parameter (e.g., an update, a hardcoded status update, a completed/uncomplete/mark complete, a measured status, a progress indication, quantity of sub-work units remaining for a given unit of work, completed work units in a given project, and/or other status parameter), one or more user comment parameters (e.g., permission for who may comments such as a creator, a recipient, one or more followers, and/or one or more other interested parties; content of the comments; one or more times; presence or absence of the functionality of up-votes; one or more hard-coded responses; and/or other parameters.), one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.,), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), quantities of work production for the unit of work (e.g., quantity of lines of code, quantity of lines of copy, etc.), other work unit parameters for the given work units, and/or other work unit parameters, and/or user parameters for one or more users and/or work units the given project is associated with.

The values of the work assignment parameter describing units of work assigned to the individual users may be determined based on one or more interactions by one or more users with a collaboration environment. In some implementations, one or more users may create and/or assign one or more unit of work to themselves and/or an other user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, for the purposes of measuring workload, values of the work assignment parameter for a unit of work indicating a status of "marked complete" and/or "complete" may be treated as if the unit of work is no longer assigned to the user for the purpose of measuring a current workload of the user.

By way of non-limiting illustration, environment state information may specify values of the work unit parameters describing a first unit of work currently assigned to the first user. The first unit of work may be associated with a start date, an end date (e.g., due date), and/or other information.

In some implementations, environment state information may be updated as users continue to interact with the collaboration environment over time. The environment state component 108 may store and/or archive the environment state information periodically and/or based on user request to archive. In some implementations, the environment state component 108 may store historical environment state information specifying historical user information, work information, user information, and/or other information. By way of non-limiting illustration, the historical environment state information may specify historical workload capacities of individual users, and/or other information.

The workload component 110 may be configured to determine values of a workload parameter for the individual users. The values of the workload parameter may specify for individual dates, individual quantities of units of work having due dates that fall on the individual dates. By way of non-limiting illustration, the values of the workload parameter for the first user may specify that a first quantity of units of work have due dates that fall on a first date. The values of the workload parameter for the first user may specify a second quantity of units of work that have due dates that fall on a second date.

The workload component 110 may be configured to obtain the schedule information for the individual users. The workload component 110 may be configured to, for individual dates, aggregate individual quantities of the calendar entries on the individual dates with the individual quantities of units of work having due dates that fall on the individual dates to generate individual aggregate quantities of workload for the individual dates. An aggregate quantity of workload for a given date may refer to a quantity of calendar entries for the given date, combined with a quantity of units of work having due dates falling on the given date, and/or other information. In some implementations, the individual aggregate quantities of workload for the individual dates may be stored as values of the workload parameter.

The user interface component 112 may be configured to effectuate presentation of a user interface on computing platforms associated with the users. The user interface may display, for the individual users, individual date panes associated with the individual dates. The individual date panes may be configured to reflect one or more of the individual quantities of units of work having due dates that fall on the individual dates, the individual quantities of calendar entries that fall on the individual dates, the individual aggregate quantities of workload for the individual dates, and/or other information. By way of non-limiting illustration, the user interface may display, for the first user, a first date pane for the first date, a second date pane for the second date, and/or other date panes. The first date pane may reflect one or more of the first quantity of units of works, a quantity of calendar entries on the first date for the first user, a first aggregate quantity of workload on the first date for the first user, and/or other information. The second date pane may reflect one or more of the second quantity of units of works, a quantity of calendar entries on the second date for the first user, a second aggregate quantity of workload on the second date for the first user, and/or other information.

By way of non-limiting illustration, displaying the individual date panes to reflect the individual values of the workload parameter determined for the individual dates may comprise of determining display characteristics of individual user interface elements that make up the individual date panes. The display characteristics may be determined to cause the individual user interface elements to reflect one or more of the values of the workload parameter. In some implementations, a first display characteristic of a first user interface element of the first date pane may be configured based on one or more of the first quantity of units of work, a quantity of calendar entries on the first date for the first user, the first aggregate quantity of workload on the first date for the first user, and/or other information. The first display characteristic of a second user interface element of the second date pane may be configured based on one or more of the second quantity of units of work, the quantity of calendar entries on the second date for the first user, the second aggregate quantity of workload on the second date for the first user, and/or other information. In some implementations, the user interface may display multiple date panes in a calendar grid. In some implementations the quantity of date pages may form one or more of a week-long calendar grid, a month-long calendar grid, and/or other length grids.

In some implementations, the display characteristics of the individual user interface elements may include one or more size, shape, color, a plot line, and/or other features. In some implementations, size may be reflective of the values of the workload parameter. For example, relatively larger quantities may result in relatively larger size user interface elements. As an illustrative example, a user interface element may include a circle that changes in size relative to the values of the workload parameter. In some implementations, certain colors may be associated with certain values of the workload parameter. For example, a given quantity (or range of quantities) may be associated with a given color, while an other given quantity (or range of quantities) may be associated with another color. As an illustrative example, a shading of a date pane may change color relative to the values of the workload parameter. In some implementations, certain shapes may be associated with certain values of the workload parameter. For example, a given quantity (or range of quantities) may be associated with a given shape, while an other given quantity (or range of quantities) may be associated with another shape. As an illustrative example, a graphic displayed within a date pane may change shape relative to the values of the workload parameter.

In some implementations, a date pane may display a workload axis representing quantities of units of work (and/or calendar entries and/or aggregate quantities of workload), and/or other components. A plot line may be plotted with respect to the workload axis. The individual quantities may be shown relative the workload axis. The workload axis may include visual increments of units of work (and/or calendar entries). A height of the plot line may represent a quantity of units of time (and/or calendar entries and/or aggregate quantities). A length of a line may represent the time span over the given date.

In some implementations, the display characteristics of the individual user interface elements may further include a quantity indicator and/or other information. The quantity indicator may display a numerical representation of the individual quantities of units of work (and/or calendar entries and/or aggregate quantities of workload) having due dates that fall on the individual dates.

A user interface may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction. The user input component 114 may be configured to obtain input information conveying user input into the individual date panes displayed in the user interface.

In some implementations, the user input component 114 may, in response to the user input, effectuate presentation of individual lists of the units of work (and/or calendar entries) having the due dates that fall on the individual dates. The individual lists may facilitate access to the individual units of work (and/or calendar entries) having the due dates that fall on the given date.

The environment state component 108 may be configured to compare, for the individual dates, individual quantities of units of work (and/or calendar entries) having due dates that fall on the individual dates with the threshold quantity of units of work for the individual dates. In some implementations, a determination may be made, based on the comparison, whether to generate notifications for the individual users. If a quantity of units of work exceeds a threshold quantity, a determination to generate a notification may be made. If a quantity of units of work (and/or calendar entries) does not exceed a threshold quantity, a determination not to generate a notification may be made. For example, if a comparison indicates a threshold quantity of a user is 10 units of work on a given day and the first user has 11 units of work to be completed by a given due date, a notification may be generated and delivered to the user and/or other users.

By way of non-limiting illustration, based on a comparison between the first threshold quantity of units of work and the first quantity of units of work for the first date shows the first quantity is greater than the first threshold quantity, a determination may be made to generate a first notification. Based on a comparison between the first threshold quantity of units of work and the second quantity of units of work for the second date shows the second quantity is less than the first threshold quantity, a determination may be made to not generate a notification.

The environment state component 108 may be configured to generate the notifications in response to determination that the notifications should be generated. The notifications may convey the results of the comparison, and/or include other information. In some implementations, other information may include recommendations on how to redistribute units of work (and/or to redate calendar entries). In some implementations, the recommendations may identify one or more other users having quantities of due dates of units of work that do not exceed a threshold of the particular date. The recommendations may be selected to automatically reassign a unit of work to a user that was identified as a quantity of due dates of units of work that do not exceed the threshold of the particular date. By way of non-limiting illustration, the first notification may be generated to include information that the first date is "overloaded" for the first user, e.g., that the first quantity of units of work having due dates on the first date exceeds the threshold. The first notification may identify a second user who may have a quantity of units of work having due dates on the first date that does not exceed a threshold quantity for the second user. The first notification may include a recommendation to reassign one or more units of work to the second user.

In some implementations, the environment state component 108 may be configured to identify one or more user(s) to receive notification(s). In some implementations, a user receiving a notification may include one or more of a given user having the overloaded date, another user having a superior relationship to the given user, another user having a subordinate relations to the given user, and/or other users. In some implementations, the given user having the overloaded date may be sent a notification first. Upon a lapse of time with no response by the given user, another user may be identified to receive the notification and the notification may be delivered.

By way of non-limiting illustration, the first user and/or a third user may be identified to receive the first notification. The third user may be identified based on the third user having a role that is superior and/or subordinate to the first user. By way of non-limiting illustration, the third user may be in a managerial role and may act on the first notification to re-distribute one or more units of work that the first user may not be able to complete by a due date.

In some implementations, the environment state component 108 may be configured to deliver the notifications. By way of non-limiting illustration, the first notification may be delivered to a computing platform of one or more users.

Figure 3:
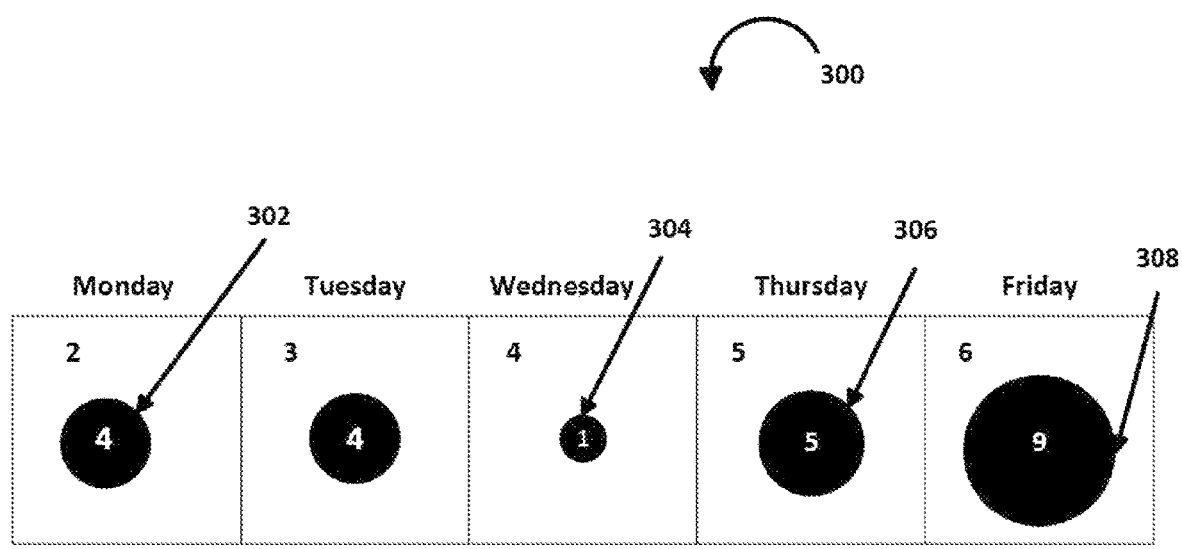
FIG. 3 illustrates an exemplary user interface, in accordance with one or more implementations.

FIG. 3 illustrates an exemplary user interface 300 visualizing a measure of workload for an individual user for a week, in accordance with one or more implementations. By way of non-limiting illustration, the user interface 300 may include a series of date panes representing individual dates in the week. The individual date panes may be configured to reflect the individual quantities of units of work having due dates that fall on the individual dates. The user interface 300 may display a visual representation of values of a workload parameter of individual users throughout the week. The user interface 300 may include one or more of a visual 302 of four units of work on a Monday, a visual of four units of work on a Tuesday, a visual 304 of one unit of work on a Wednesday, a visual 306 of five units of work on a Thursday, a visual 308 of nine units of work on a Friday, and/or other visualizations. As illustrated, the individual date panes include user interface elements in the form of circles. Display characteristics of individual user interface elements, in this case size, may be configured to reflect the individual quantities of units of work.

It is noted that FIG. 3 is for illustrative purposes only and is not to be considered limiting. Instead, it is to be understood that the user interface 300 may be configured in other ways and/or including other elements in accordance with one or more implementations of the system 100 presented herein.

Figure 4:
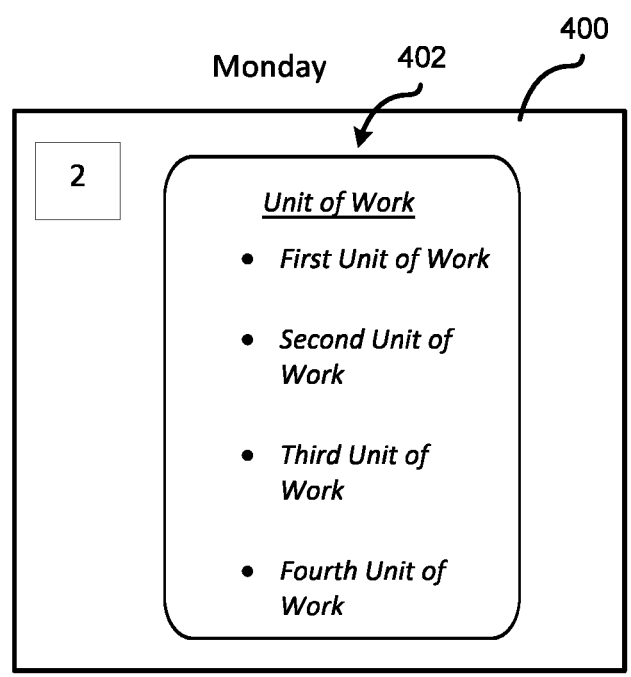
FIG. 4 illustrates an exemplary user interface, in accordance with one or more implementations.

FIG. 4 illustrates a user interface 400, in accordance with one or more implementations. The user interface 400 may include one or more user interface elements configured to facilitate user interaction with the user interface 400. The user interface 400 may be generated in response to input into the individual date panes displayed in the user interface 300 of FIG. 3. In response to the user input, presentation of an individual list of the units of work 402 on an individual date may be displayed in the user interface.

In some implementations, the user interface 400 may include a portion 402 displaying an individual list of the units of work. By way of non-limiting illustration, the units of work listed in portion 402 may facilitate access to the individual units of work for that date. FIG. 4 is for illustrative purposes only and is not to be considered limiting. Instead, it is to be understood that the user interface 400 may be configured in other ways and/or including other elements to facilitate other user interaction in accordance with one or more implementations of the system 100 presented herein.

In FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
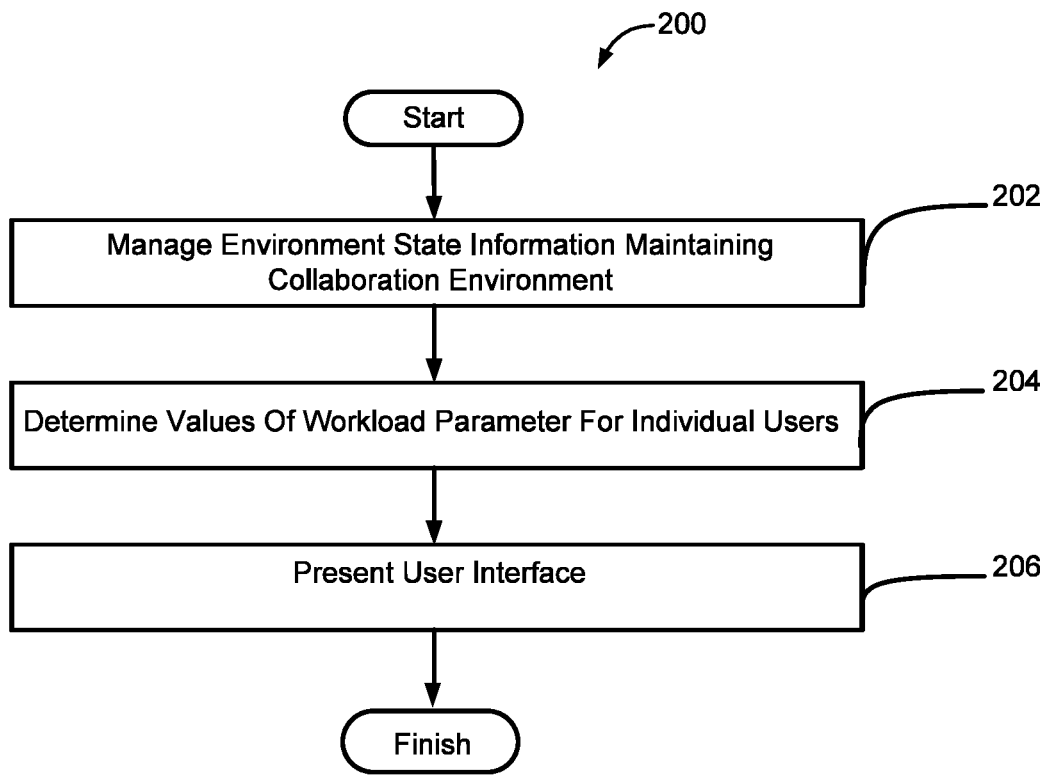
FIG. 2 illustrates a method to measure and visualize workload for individual users, in accordance with one or more implementations.

FIG. 2 illustrates a method 200 to measure and visualize workload for individual users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include work unit records, user records, and/or other records. The work unit records may include work unit information for units of work managed, created, and/or assigned within the collaboration environment. The work unit information for individual units of work may include individual due dates for expected completion of the individual units of work by individual users assigned to the individual units of work. Operation 202 may be performed by one or more hardware processors configured by machine-readable instructions including a component that is the same as or similar to environment state component 108, in accordance with one or more implementations.

An operation 204 may determine values of a workload parameter for the individual users. The values of the workload parameter may specify, for individual dates, individual quantities of units of work having due dates that fall on the individual dates. By way of non-limiting illustration, the values of the workload parameter for a first user may specify that a first quantity of units of work have due dates that fall on a first date. A second quantity of units of work may have due dates that fall on a second date. Operation 204 may be performed by one or more hardware processors configured by machine-readable instructions including a component that is the same as or similar to workload component 110, in accordance with one or more implementations.

An operation 206 may present, to individual users, a user interface on a computing platform associated with the users. The user interface may display individual date panes associated with the individual dates. The individual date panes may be configured to reflect the individual quantities of units of work having due dates that fall on the individual dates. By way of non-limiting illustration, the user interface may display, for the first user, a first date pane for the first date, and/or a second date pane for the second date. The first date pane may reflect the first quantity of units of work and/or the second date pane may reflect the second quantity of units. Operation 206 may be performed by one or more hardware processors configured by machine-readable instructions including a component that is the same as or similar to user interface component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to measure and visualize workload for individual users, the system comprising:
   one or more physical processors configured by machine-readable instructions to:
   manage environment state information maintaining a collaboration environment, the collaboration environment being configured to facilitate interaction by users with the collaboration environment, the environment state information including work unit records, the work unit records including work unit information for units of work managed, created, and/or assigned within the collaboration environment, wherein the work unit information for individual units of work includes individual due dates for expected completion of the individual units of work by individual users assigned to the individual units of work;
   determine values of a workload parameter for the individual users, the values of the workload parameter specifying, for individual dates, individual quantities of units of work having due dates that fall on the individual dates, such that the values of the workload parameter for a first user specify that a first quantity of units of work have the due dates that fall on a first date, and a second quantity of units of work have the due dates that fall on a second date;
   generate, based on the values of the workload parameter, user interface information defining a user interface that reflects the individual quantities of units of work having the due dates that fall on the individual dates, such that the user interface displays, for the individual users, individual date panes associated with the individual dates, wherein the individual date panes are configured to reflect the individual quantities of units of work having the due dates that fall on the individual dates, such that the user interface displays, for the first user, a first date pane for the first date, and a second date pane for the second date, the first date pane reflecting the first quantity of units of work and the second date pane reflecting the second quantity of units of work, and wherein the user interface information is generated based on:
   identifying display characteristics of individual user interface elements that make up the individual date panes that are to be configured based on the individual quantities of units of work having the due dates that fall on the individual dates, the display characteristics including size, shape, and color; and
   configuring one or more of the display characteristics of the individual user interface elements to reflect the individual quantities of units of work having the due dates that fall on the individual dates, such that a first display characteristic of a first user interface element of the first date pane is configured based on the first quantity of units of work, and the first display characteristic of a second user interface element of the second date pane is configured based on the second quantity of units of work;
   effectuate communication of the user interface information to computing platforms associated with the users to cause the computing platforms to present the user interface, such that the user interface information is communicated to a first computing platform associated with the first user to cause the first computing platform to present the user interface displaying the first date pane reflecting the first quantity of units of work and the second date pane reflecting the second quantity of units of work;
   determine updates to the environment state information that impact the values of the workload parameter for the individual users, the updates being caused by continued interaction with the collaboration environment by the users via the computing platforms; and
   update, based on the updates to the environment state information, the values of the workload parameter for the individual users and the user interface information communicated to individual computing platforms so that the user interface presented by the individual computing platforms includes the individual date panes reflecting up-to-date individual quantities of units of work having the due dates that fall on the individual dates.

2. The system of claim 1, wherein the display characteristics of the individual user interface elements further include a quantity indicator, wherein the quantity indicator displays a numerical representation of the individual quantities of units of work having the due dates that fall on the individual dates.

3. The system of claim 1, wherein the user interface displays multiple date panes in a calendar grid.

4. The system of claim 1, wherein the one or more physical processors are further configured by the machine-readable instructions to:
   obtain schedule information for the individual users, the schedule information including calendar entries for the individual dates;
   aggregate, for the individual dates, individual quantities of the calendar entries on the individual dates with the individual quantities of units of work having the due dates that fall on the individual dates to generate individual aggregate quantities of workload for the individual dates; and
   effectuate presentation of the user interface so that the individual date panes reflect the individual aggregate quantities of workload.

5. The system of claim 1, wherein the one or more physical processors are further configured by the machine-readable instructions to:
  obtain input information conveying user input into the individual date panes displayed in the user interface; and
  in response to the user input, effectuate presentation of individual lists of the units of work having the due dates that fall on the individual dates, wherein the individual lists facilitate access to the individual units of work.

6. The system of claim 1, wherein the environment state information further includes user records, the user records including user information for the individual users, the user information including workload capacity for the individual users on individual dates, wherein the workload capacity includes a threshold quantity of units of work, such that a first user record for the first user specifies a first threshold quantity of units of work for the first date and the second date.

7. The system of claim 6, wherein the one or more physical processors are further configured by the machine-readable instructions to:
  compare, for the individual dates, individual quantities of units of work having the due dates that fall on the individual dates with the threshold quantity of units of work for the individual dates;
  based on the comparison, determine whether to generate notifications for the individual users, such that based on a comparison between the first threshold quantity of units of work and the first quantity of units of work for the first date, determine that a first notification is to be generated, and based on a comparison between the first threshold quantity of units of work and the second quantity of units of work for the second date, determine no notifications are to be generated; and
  deliver the notifications, such that the first notification is delivered.

8. The system of claim 7, wherein the one or more physical processors are further configured by the machine-readable instructions to:
  identify the users to receive the notifications, including identifying the first user or a second user to receive the first notification.

9. A method configured to measure and visualize workload for individual users, the method comprising:
  managing environment state information maintaining a collaboration environment, the collaboration environment being configured to facilitate interaction by users with the collaboration environment, the environment state information including work unit records, the work unit records including work unit information for units of work managed, created, and/or assigned within the collaboration environment, wherein the work unit information for individual units of work includes individual due dates for expected completion of the individual units of work by individual users assigned to the individual units of work;
  determining values of a workload parameter for the individual users, the values of the workload parameter specifying, for individual dates, individual quantities of units of work having due dates that fall on the individual dates, such that the values of the workload parameter for a first user specify that a first quantity of units of work have the due dates that fall on a first date, and a second quantity of units of work have the due dates that fall on a second date;
  generating, based on the values of the workload parameter, user interface information defining a user interface that reflects the individual quantities of units of work having the due dates that fall on the individual dates, such that the user interface displays, for the individual users, individual date panes associated with the individual dates, wherein the individual date panes are configured to reflect the individual quantities of units of work having the due dates that fall on the individual dates, such that the user interface displays, for the first user, a first date pane for the first date, and a second date pane for the second date, the first date pane reflecting the first quantity of units of work and the second date pane reflecting the second quantity of units of work, and wherein the generating the user interface information comprises:
    identifying display characteristics of individual user interface elements that make up the individual date panes that are to be configured based on the individual quantities of units of work having the due dates that fall on the individual dates, the display characteristics including size, shape, and color; and
    configuring one or more of the display characteristics of the individual user interface elements to reflect the individual quantities of units of work having the due dates that fall on the individual dates, such that a first display characteristic of a first user interface element of the first date pane is configured based on the first quantity of units of work, and the first display characteristic of a second user interface element of the second date pane is configured based on the second quantity of units of work;
  effectuating communication of the user interface information to computing platforms associated with the users to cause the computing platforms to present the user interface, including effectuating communication of the user interface information to a first computing platform associated with the first user to cause the first computing platform to present the user interface displaying the first date pane reflecting the first quantity of units of work and the second date pane reflecting the second quantity of units of work;
  determining updates to the environment state information that impact the values of the workload parameter for the individual users, the updates being caused by continued interaction with the collaboration environment by the users via the computing platforms; and
  updating, based on the updates to the environment state information, the values of the workload parameter for the individual users and the user interface information communicated to individual computing platforms so that the user interface presented by the individual computing platforms includes the individual date panes reflecting up-to-date individual quantities of units of work having the due dates that fall on the individual dates.

10. The method of claim 9, wherein the display characteristics of the individual user interface elements includes a quantity indicator, wherein the quantity indicator displays a numerical representation of the individual quantities of units of work having the due dates that fall on the individual dates.

11. The method of claim 9, wherein the user interface displays multiple date panes in a calendar grid.

12. The method of claim 9, further comprising:
  obtaining schedule information for the individual users, the schedule information including calendar entries for the individual dates;

aggregating, for the individual dates, individual quantities of the calendar entries on the individual dates with the individual quantities of units of work having the due dates that fall on the individual dates to generate individual aggregate quantities of workload for the individual dates; and effectuating presentation of the user interface so that the individual date panes reflect the individual aggregate quantities of workload.

13. The method of claim 9, further comprising:

obtaining input information conveying user input into the individual date panes displayed in the user interface; and in response to the user input, effectuating presentation of individual lists of the units of work having the due dates that fall on the individual dates, wherein the individual lists facilitate access to the individual units of work.

14. The method of claim 9, wherein the environment state information further includes user records, the user records including user information for the individual users, the user information including workload capacity for the individual users on individual dates, wherein the workload capacity includes a threshold quantity of units of work, such that a first user record for the first user specifies a first threshold quantity of units of work for the first date and the second date.

15. The method of claim 14, further comprising:

comparing, for the individual dates, individual quantities of units of work having the due dates that fall on the individual dates with the threshold quantity of units of work for the individual dates;

based on the comparison, determining whether to generate notifications for the individual users, including based on a comparison between the first threshold quantity of units of work and the first quantity of units of work for the first date, determining that a first notification is to be generated, and based on a comparison between the first threshold quantity of units of work and the second quantity of units of work for the second date, determining no notifications are to be generated; and delivering the notifications, including delivering the first notification.

16. The method of claim 15, further comprising:

identifying the users to receive the notifications, including identifying the first user or a second user to receive the first notification.

* * * * *